United States Patent
Kohli (10) Patent No.: US 11,222,321 B2
(45) Date of Patent: Jan. 11, 2022

(54) SYSTEMS AND METHODS FOR USE IN VERIFYING USERS TO SERVICE PROVIDERS

(71) Applicant: MASTERCARD INTERNATIONAL INCORPORATED, Purchase, NY (US)

(72) Inventor: Manoneet Kohli, White Plains, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 195 days.

(21) Appl. No.: 16/006,296

(22) Filed: Jun. 12, 2018

(65) Prior Publication Data

US 2019/0378102 A1 Dec. 12, 2019

(51) Int. Cl.
*G06Q 20/40* (2012.01)
*G06Q 20/12* (2012.01)
*H04L 29/06* (2006.01)
*G06Q 20/36* (2012.01)
*G06F 9/54* (2006.01)

(52) U.S. Cl.
CPC ........... *G06Q 20/127* (2013.01); *G06F 9/547* (2013.01); *G06Q 20/36* (2013.01); *G06Q 20/4014* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 7,155,739 B2* | 12/2006 | Bari | G06F 21/41 726/6 |
| 9,203,821 B2* | 12/2015 | Robison | H04L 63/08 |
| 9,508,071 B2* | 11/2016 | Phillips | G06Q 20/322 |
| 9,613,377 B2* | 4/2017 | Sheets | G06Q 20/3552 |
| 9,658,996 B2* | 5/2017 | Seto | G06F 40/174 |
| 9,864,987 B2* | 1/2018 | McCarthy | G06Q 20/388 |
| 10,963,901 B2* | 3/2021 | Bhattacharjee | G06Q 20/387 |

(Continued)

FOREIGN PATENT DOCUMENTS

| KR | 100423580 | 3/2004 |
|---|---|---|
| KR | 1020150000266 | 1/2015 |

*Primary Examiner* — Christopher Bridges
(74) *Attorney, Agent, or Firm* — Harness, Dickey & Pierce, P.L.C.

(57) ABSTRACT

Systems and methods are provided for verifying a user, through an account associated with the user, in connection with a subscription of the user to a service from a service provider. One exemplary system includes a memory having an account for the user, and a platform computing device coupled to and/or including the memory. The computing device is configured to receive a request from the service provider, in connection with the user subscribing to the service, and authenticate the user. When the user is authenticated, the computing device is configured to generate a subscription message for the user comprising assurance data based on the user's account, a timestamp, and an identifier associated with the user, and transmit the subscription message to the service provider, to thereby permit the service provider to rely on the assurance data to verify the user.

19 Claims, 3 Drawing Sheets

(56) References Cited

U.S. PATENT DOCUMENTS

| | | | |
|---|---|---|---|
| 2012/0227098 A1* | 9/2012 | Obasanjo | H04L 63/0807 |
| | | | 726/8 |
| 2013/0246261 A1* | 9/2013 | Purves | G06Q 20/105 |
| | | | 705/41 |
| 2014/0006283 A1* | 1/2014 | Hogg | G06Q 20/384 |
| | | | 705/44 |
| 2014/0229388 A1* | 8/2014 | Pereira | G06Q 20/12 |
| | | | 705/76 |
| 2015/0026049 A1* | 1/2015 | Theurer | G06Q 20/227 |
| | | | 705/41 |
| 2016/0072780 A1 | 3/2016 | Seto et al. | |
| 2017/0163628 A1 | 6/2017 | Zhang | |

* cited by examiner

SYSTEMS AND METHODS FOR USE IN VERIFYING USERS TO SERVICE PROVIDERS

FIELD

The present disclosure generally relates to systems and methods for use in facilitating verification of users to service providers, and in particular, to systems and methods for use in verifying personal identifying information associated with the users, from virtual applications of the users, and providing the verified personal identifying information to the service providers in connection with subscriptions, by the users, to services offered by the service providers.

BACKGROUND

This section provides background information related to the present disclosure which is not necessarily prior art.

Users are known to subscribe to different services offered by various provider entities, generally, service providers. For example, a user may sign up for a financial product, such as a banking account, etc., whereby the user is required to provide certain personal identifying information (PII) to the service provider providing the bank account (e.g., a bank, etc.). Upon receipt of the PII, depending on the particular type of PII and the service being offered, the service provider is then obligated, or required, to check and/or verify the PII for the user. In another example, the user may subscribe to a utility service provider (for a utility account) when moving into a new residence, in which the utility service provider also requires the user to provide PII to set up the user as a new customer and to turn on new service. Verification of the PII, by the utility service provider, may vary in complexity and/or scope depending on the type of utility and/or the type of property, etc. In either example, once the PII of the user is verified, the service provider provides the appropriate account to the user, who, in turn, utilizes the subscribed services provided by the respective service provider through the account.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The description and specific examples included herein are intended for purposes of illustration only and are not intended to limit the scope of the present disclosure.

Users subscribe to services offered by service providers for various different reasons, whereby, upon approval, the users are associated with accounts (from the service providers) that are specific to the users, where the users' use of the services is recorded and/or attributed to the accounts. To apply for such services (and accounts), the service providers gather certain personal identifying information (PII) about the users, which is verified and, optionally, becomes part of the users' accounts. Users may apply for multiple different such accounts from multiple different types of service providers over the course of time. For such multiple accounts, the users are requested to provide the same or similar personal identifying information, over and over again, which is then verified in one manner or another for each of the accounts. As can be appreciated, separately collecting and verifying the users' information, by the service providers, in connection with each of the multiple accounts, may increase friction in the users' experiences with the given service providers and/or potential risks for identity theft.

Uniquely, the systems and methods herein permit virtual wallets associated with the users to be employed to provide verified personal identifying information (PII) to the service providers in connection with applications for multiple different accounts. In particular, when a user seeks to subscribe to and/or enroll in a service from a service provider, the user is presented with the option to subscribe to the service with a virtual wallet application. When selected, the service provider requests verification of the user and, in some instances, PII for the user, from a virtual wallet platform (associated with the user's virtual wallet application). In response, prior to interacting with the service provider, the virtual wallet platform may authenticate the user (for the request), and also may seek consent from the user to provide PII to the service provider. Thereafter, the virtual wallet platform transmits a subscription message to the service provider. The subscription message includes, for example, a wallet identifier and assurance data associated with the user and/or token(s) included in the user's virtual wallet application. The assurance data may include, without limitation, a flag indicative of one or more provisioned token(s), an interval associated with stability and/or activity of the virtual wallet account and/or payment account provided thereto (e.g., an interval since a last transaction, an interval since adding the payment account to the virtual wallet account, etc.), etc. In response to the subscription message, the service provider is able to proceed in subscribing the user to the service (e.g., based on the subscription message, etc.) and/or to seek additional verification of the user. In this manner, a financial institution, which has provisioned the token to the virtual wallet application, has already issued a payment account to the user, and thus, completed verification of the user (e.g., via a know-your-customer (KYC) process, etc.). The systems and methods herein leverage that financial institution's action(s) to allow the service provider (and other service providers) to avoid further verification of the user via a third party, etc., thereby enhancing and/or making more efficient such subscription processes for the user with the service provider's service (and the associated KYC processes).

Figure 1:
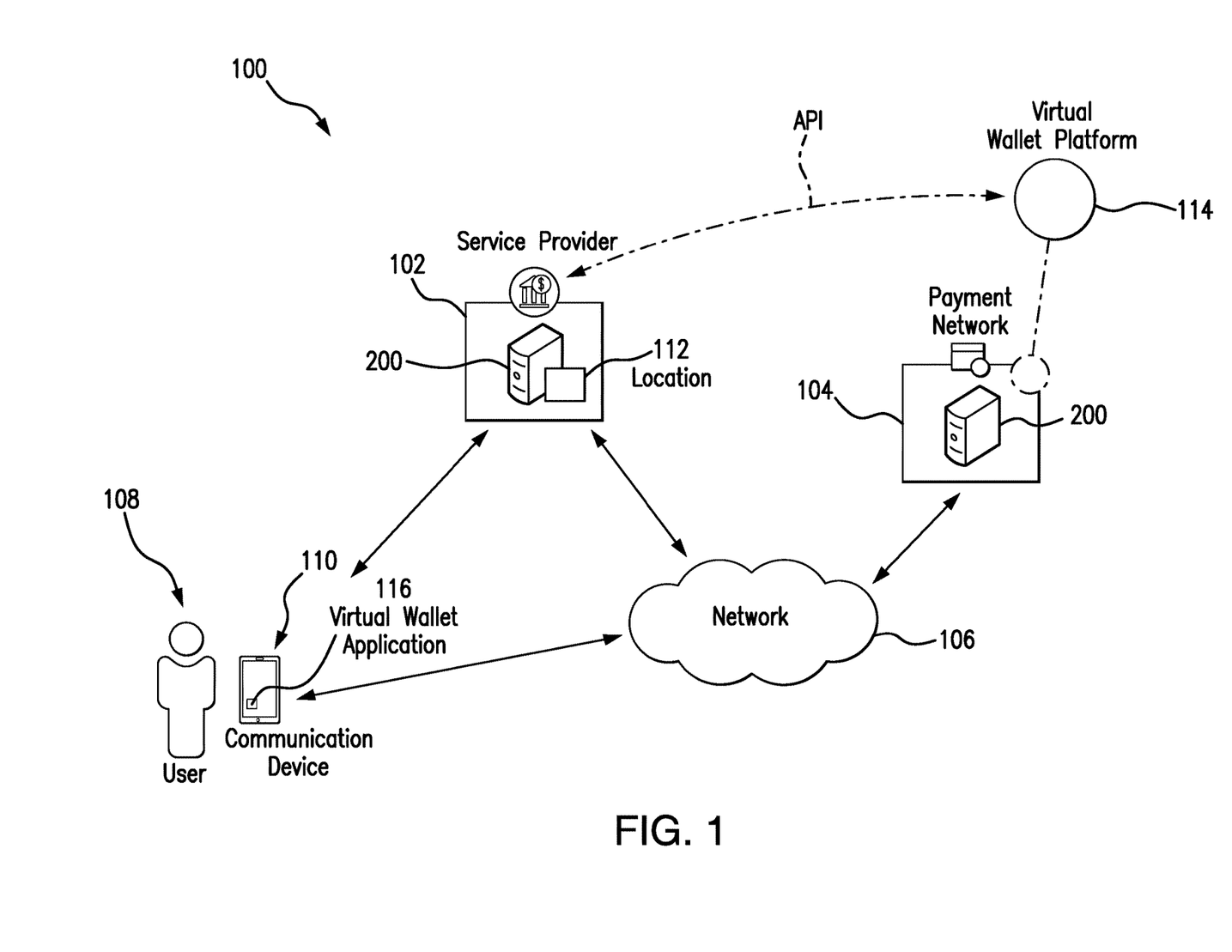
FIG. 1 illustrates an exemplary system of the present disclosure suitable for use in verifying personal identifying information of a user in connection with a subscription to one or more services, through a virtual wallet application associated with the user.

FIG. 1 illustrates an exemplary system 100 in which one or more aspects of the present disclosure may be implemented. Although the system 100 is presented in one arrangement, other embodiments may include systems arranged otherwise depending, for example, on types of service providers, interactions between the service providers and one or more financial institutions, payment networks, virtual wallet applications and/or virtual wallet platforms; applicable privacy requirements; etc.

The illustrated system 100 generally includes a service provider 102 and a payment network 104, each coupled to (and in communication with) network 106. The network 106 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, the network 106 may include multiple different networks, such as a private payment transaction network made accessible by the payment network 104 to one or more financial institutions (e.g., banks, payment account issuers, acquirers, etc.), and separately, the public Internet, which is accessible as desired to the service provider 102 and communication devices associated with different users in the system 100 (e.g., communication device 110 associated with user 108, etc.).

The service provider 102 in the system 100 may include any entity that offers one or more services to which users (including the user 108) can subscribe (e.g., enroll, register, etc.). The services may include, without limitation, financial services, utility services, telecommunication services, health services, fitness services, entertainment services, etc. In the illustrated embodiment, the service provider 102 is described as a banking institution configured to offer account services to users (e.g., payment accounts, savings accounts, credit accounts, etc.). In other embodiments, the service provider 102 may include a utility provider, which offers utility services (e.g., electricity, gas, water, sewer, telecommunications, cable, etc. services) to users, and for which the users may subscribe, or any other suitable service provider available to provide one or more services to the user 108. It should be appreciated that other examples of service providers will be apparent to those skilled in the art, especially where the subscriptions to the services offered by such service providers is based on enrollment and verification of the users in association with the services provided.

The service provider 102 is also associated with a location 112, at which or through which the user 108 is able to interact with the service provider 102, for example, in connection with enrolling the user 108 in the one or more services offered by the service provider 102, or in allowing the user 108 to manage one or more services for which he/she is enrolled, etc. The location 112 may be a virtual location or a physical location. When the location 112 is a virtual location, it may include a website hosted by the service provider 102 (or on behalf of the service provider 102), or the virtual location may include a network-based application, which is hosted and/or supported by a backend computing device (at the service provider 102 or associated therewith) and also installed and/or active in the communication device 110 of the user 108, etc. When the location 112 is a physical location, it may include a terminal (e.g., a point of sale (POS) terminal, etc.) disposed at (or associated with) a physical location of the service provider 102 and/or accessible to the user 108 at another location. In general, the service provider location 112 provides one or more interfaces for the user 108 (and other users) to browse the services(s) offered by the service provider 102 and to subscribe to the service(s). That said, the service provider location 112 is generally referred to herein, for ease of reference, as being a virtual location.

The payment network 104 in the system 100 is configured to interact with one or more acquirers and/or issuers in a conventional four-party model, along with one or more merchants, to process payment account transactions between consumers (including, potentially, the user 108) and the merchant(s). In particular, the payment network 104 is configured to provide and/or facilitate, in whole or in part, authorization, clearing and settlement of the payment account transactions between the consumers and the merchant(s).

With continued reference to FIG. 1, the system 100 also includes a virtual wallet platform 114 (e.g., the MasterPass® wallet platform, etc.), which is configured as a backend to perform one or more virtual wallet operations in the system 100 (e.g., facilitate payment account transactions at merchants, etc.). In connection therewith, the virtual wallet platform 114 may be associated with and/or included in the payment network 104, as indicated by the dotted line, and configured to interact therewith as described herein. Alternatively, however, the virtual wallet platform 114 may be integrated otherwise in the system 100, such as, for example, in an issuer (configured to issue payment accounts to consumers), etc. Or, the virtual wallet platform 114 may be a standalone, separate entity in the system 100, which is configured to operate apart from the payment network 104, while still participating in payment account transactions that are processed by the payment network 104 and/or other entities in the system 100 (e.g., acquirers, issuers, other payment networks, etc.).

Also in the system 100, the user 108 is associated with the communication device 110, which may include, without limitation, a smartphone, a laptop, a workstation, etc. In the illustrated embodiment, the communication device 110 includes a virtual wallet application 116 (or virtual wallet, electronic wallet, or e-wallet, etc.) (or more broadly, application) therein and/or associated therewith. The virtual wallet application 116 is associated with and/or cooperates with the virtual wallet platform 114, such that the virtual wallet application 116 is provided in association with the virtual wallet platform 114 (whether included in the payment network 104, included in an issuer (not shown), or standalone, etc.). With that said, the virtual wallet application 116 configures the communication device 110 to cooperate with the virtual wallet platform 114, as necessary or desired, to facilitate payment account transactions with merchants. The virtual wallet application 116 may include, without limitation, the MasterPass® application, the Apple Pay® application, the PayWave® application, etc., or another suitable payment application as desired. In at least on embodiment, the virtual wallet application 116 is, more broadly, a mobile application, which may be associated with the user 108 (and include PII), but is not usable to facilitate payment account transactions. Likewise, the virtual wallet platform 114 may then, more broadly, include a backend platform for the mobile application 116, whereby the platform 114 includes PII for the user 108 and cooperates with the mobile application 116.

When the virtual wallet application 116 is installed and active in the communication device 110, one or more payment accounts associated with the user 108 (i.e., issued accounts) may be added or provisioned to the virtual wallet application 116 (although this functionality is not required in all embodiments). For example, in the illustrated embodiment, the user 108 is associated with a payment account, issued by an issuing banking institution (or issuer, not shown). And, the user 108 selects, in the virtual wallet application 116, to add the payment account to the virtual wallet application 116. In response, the communication device 110, as configured by the virtual wallet application 116, solicits the details of the payment account (e.g., the primary account number (PAN), the expiration date, the card-verification code (CVC), etc.) and other suitable data (e.g., a billing address for the user 108, a name of the user 108, contact information, etc.). When requested and/or when sufficient data is provided, the communication device 110, as configured by the virtual wallet application 116, is configured to generate a request to provision the payment account thereto and transmit the request to the virtual wallet platform 114 and/or the issuer of the payment account. In turn, subject to one or more conditions and/or verifications, the virtual wallet platform 114 and/or issuers cooperate to provision a payment account credential such as, for example, a token, etc., specific to the identified the payment account, to the virtual wallet application 116 at the communication device 110, whereupon the token is stored in the communication device 110. The above may be repeated to provision additional tokens, each associated with a different payment account, to the virtual wallet application 116.

Thereafter in the system 100, the communication device 110 is configured, by the virtual wallet application 116, to be employed as a payment device to initiate payment account transactions at merchants, for example, whereby the communication device 110 provides the provisioned token (for the user's payment account) to the merchant facilitate the transactions. In connection therewith, it should be appreciated that the communication device 110, as configured by the virtual wallet application 116 (alone or in coordination with the virtual wallet platform 114) is configured to maintain a transaction history for transactions directed to the user's payment account and performed with the virtual wallet application 116. The transaction history, along with the payment account credentials and details of the user's payment account, are further maintained, by the virtual wallet platform 114 and/or the virtual wallet application 116, in a virtual wallet account (or accounts) associated with the communication device 110 and/or the user 108 (e.g., as generated upon registration of the user 108 with the virtual wallet platform 114 for the virtual wallet application 116, etc.). Further, the virtual wallet platform 114 is configured and/or the communication device 110 is configured, by the virtual wallet application 116, to record details of the payment account being provisioned to the virtual wallet account, such as, for example, the time and/or date of the token being added, provisioned, deleted, etc. When the virtual wallet account includes multiple payment account tokens, details will be recorded (in memory) to the virtual wallet account for each of the payment accounts.

In addition to the provisioning of tokens specific to the payment accounts, the user 108 may cooperate with the issuer of the payment account and/or the virtual wallet platform 114 to provision personal identifying information (PII) to a token, for example, associated with the wallet application 116 and/or the wallet platform 114 for presentment in connection with the service provider 102 or other entities. The PII in the token may include data about the user 108 in any form, including, without limitation, plain data as provided to and/or received from an issuer of the payment account, an image of a physical document (e.g., a driver's license, a passport, a government identification (ID), a medical insurance card, etc.) (e.g., which is verified by the issuer of the payment account or otherwise), etc.

In the system 100, while only one service provider 102, one payment network 104, one user 108 (and his/her associated communication device 110), and one virtual wallet platform 114 are illustrated in FIG. 1, it should be appreciated that a different number of these entities and devices (and their associated components) may be included in the system 100, or may be included as a part of other system embodiments, consistent with the present disclosure.

Figure 2:
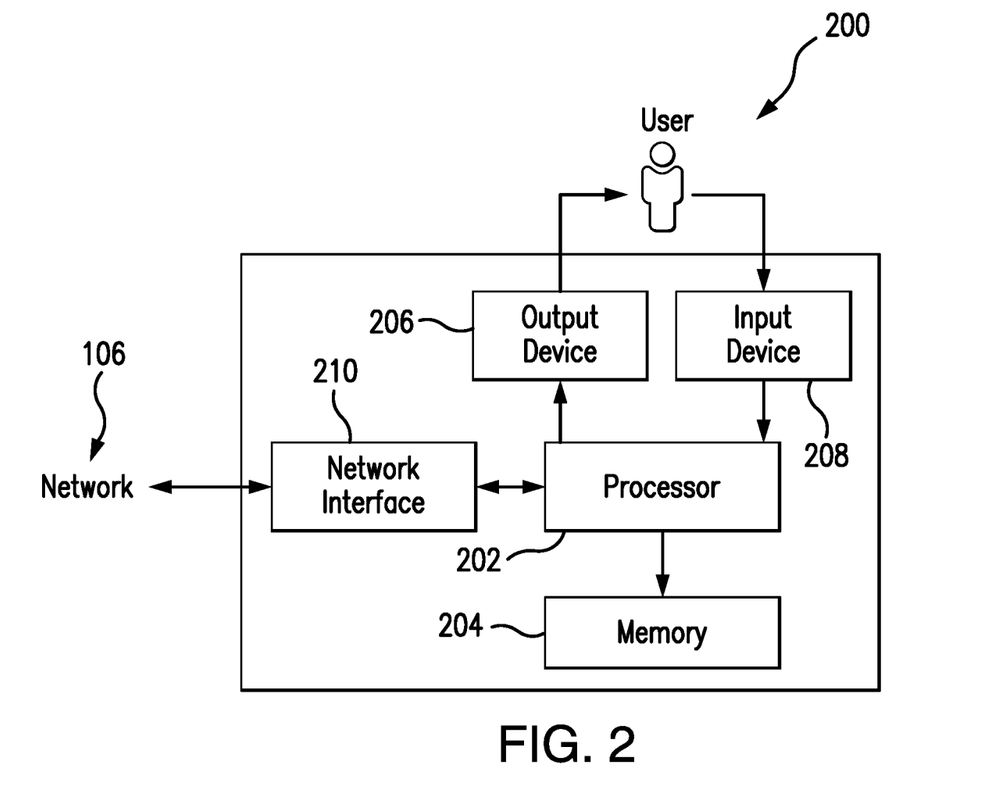
FIG. 2 is a block diagram of a computing device that may be used in the exemplary system of FIG. 1.

FIG. 2 illustrates an exemplary computing device 200 that may be used in the system 100. The computing device 200 may include, for example, one or more servers, workstations, personal computers, laptops, tablets, smartphones, PDAs, POS devices, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the service provider 102 and the payment network 104 are illustrated as including, or being implemented in, computing device 200, coupled to the network 106. In addition, the communication device 110 associated with the user 108 and the virtual wallet platform 114 may also each be considered a computing device consistent with computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to the processor 202. The processor 202 may include one or more processing units (e.g., in a multi-core configuration, etc.). For example, the processor 202 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. That said, the memory 204 may be configured to store, without limitation, transaction data, PII, interfaces, accounts, payment account credentials, assurance data (e.g., intervals since issuance, intervals since last transactions, intervals since payment accounts were added to virtual wallet applications, etc.), virtual wallet identifiers, service provider identifiers, and/or other types of data (and/or data structures) suitable for use as described herein. Furthermore, in various embodiments, computer-executable instructions may be stored in the memory 204 for execution by the processor 202 to specifically cause the processor 202 to perform one or more of the unique functions described herein, such that the memory 204 is a physical, tangible, and non-transitory computer-readable storage media. Such instructions often improve the efficiencies and/or performance of the processor 202 as described herein in connection with performing the recited operations. It should be appreciated that the memory 204 may include a variety of different memories, each implemented in one or more of the functions or processes described herein.

In the exemplary embodiment, the computing device 200 includes an output device 206 that is coupled to the processor 202 (however, it should be appreciated that the computing device 200 could include output devices other than the output device 206, etc.). The output device 206 outputs information, subscription options, etc. either visually or audibly to a user of the computing device 200, for example, the user 108, etc. In addition, it should be appreciated that various interfaces (as described herein) may be displayed at computing device 200, and in particular at output device 206, to display such information. With that said, the output device 206 may include, without limitation, a presentation unit such as a liquid crystal display (LCD), a light-emitting diode (LED) display, an organic LED (OLED) display, an "electronic ink" display; speakers; another computing device, etc. In some embodiments, the output device 206 may include multiple devices.

The computing device 200 also includes an input device 208 that receives inputs from the user (i.e., user inputs) such as, for example, selections of particular services, selections to subscribe to particular services, selections to subscribe with virtual wallets, etc. The input device 208 is coupled to the processor 202 and may include, for example, a keyboard, a pointing device, a mouse, a touch sensitive panel, another computing device, and/or an audio input device. Further, in various exemplary embodiments, a touch screen, such as that included in a tablet, a smartphone, or similar device, may behave as both the output device 206 and the input device 208.

In addition, the illustrated computing device 200 also includes a network interface 210 coupled to the processor 202 and the memory 204. The network interface 210 may include, without limitation, a wired network adapter, a wireless network adapter, a mobile network adapter (e.g., an NFC adapter, a Bluetooth adapter, etc.), or other device capable of communicating to one or more different networks, including the network 106. Further, in some exemplary embodiments, the computing device 200 may include the processor 202 and one or more network interfaces incorporated into or with the processor 202.

Referring again to FIG. 1, in use, the user 108 may interact with the service provider 102 through the virtual location 112, for example, to browse services offered by the service provider 102. When the user 108 decides to subscribe to one or more of the services, the user 108 selects the one or more services or otherwise, at the virtual location 112, to indicate intent or desire to subscribe to the one or more services. In response, the service provider 102 (and, in particular, the computing device 200 with which the virtual location 112 is associated) is configured to provide a subscription interface to the user 108, at the communication device 110 or another communication device (or, potentially, at a terminal associated with the service provider 102 (e.g., at a physical location, etc.) and viewable by the user 108). The subscription interface offers the user 108 the option (and includes such option) to subscribe to the desired one or more services as is conventional (e.g., by directly providing PII to the service provider 102 to be verified by the service provider 102, etc.), and the option to subscribe to the one or more services through the user's virtual wallet application 116 (and/or to select among a number of virtual wallet applications (e.g., applications provided by an entity with which the service provider 102 has a trusted relationship, etc.)).

When the user 108 selects the option to subscribe with his/her virtual wallet application 116, the service provider 102 (and, in particular, the computing device 200 associated therewith) is configured to solicit from the user 108, through the subscription interface (or another interface), a selection of the specific virtual wallet application 116 associated with the user 108 and/or an identifier associated with the virtual wallet application 116 (e.g., a phone number for the user 108, an email address, a device identifier (ID), etc.), and/or a provisioned link associated with a hosted application (e.g., when the virtual wallet application 116 is integrated with the hosted application (e.g., via an SDK, etc.), etc.). In response, the user 108 provides the requested information (e.g., a selection of the virtual wallet application 116 and the associated phone number, etc.) through the subscription interface to the virtual location 112. In turn, the service provider 102 (and, in particular, the computing device 200 associated therewith) is configured to identify the virtual wallet platform 114 (as being associated with the user's virtual wallet application 116 and configured to manage the user's virtual wallet account) and call an application programming interface (API) associated with the virtual wallet platform 114. The API call includes a request, from the service provider 102, to the virtual wallet platform 114, for verification of the user 108 (in connection with registering the user 108 for the selected service(s) provided by the service provider 102) and/or for PII associated with the user 108. The virtual wallet platform 114 is configured to then receive the request and to authenticate the user 108. In particular, the virtual wallet platform 114 is configured to cause a login interface to be displayed to the user 108 (e.g., a light box pop-up overlaid on the virtual location 112 of the service provider 102, or at the virtual wallet application 116 at the user's communication device 110, etc.). The login interface solicits a username, an identifier and/or password, or other login credential for the user's virtual wallet application 116 (and associated account), by which the user 108 is authenticated thereto. When the user 108 responds in the login interface with login credentials, the virtual wallet platform is configured to determine if the provided login credentials match the login credentials stored in the virtual wallet account for the user 108. When matched, the user 108 is authenticated. It should be appreciated that the virtual wallet platform 114 may interaction with the virtual location 112, the virtual wallet application 116, etc., in other manners to facilitate authentication of the user 108, etc.

Optionally, as part of the login interface, or in addition to causing the login interface to display to the user 108, the virtual wallet platform 114 may be configured to cause a consent interface to display to the user 108 and/or solicit (e.g., in a light box overlaid on the virtual location 112, or an interface through the virtual wallet application 116, etc.) consent from the user 108 to verify the user and/or to share PII with the service provider 102. Additional interfaces may further be provided to the user 108, via the communication device 110, from the virtual wallet platform 114, for example, to solicit agreement to privacy policies and/or confirm identification of specific PII to be shared and/or not shared with the service provider 102.

Then in the system 100, in response to the API call and also a valid login credential from the user 108 (via the communication device 110 and the login interface) (and a grant of consent and/or responses to other interfaces, as applicable), the virtual wallet platform 114 is configured to generate a subscription message and to transmit the subscription message to the service provider 102. In this exemplary embodiment, the subscription message includes PII (e.g., a name, billing address, phone number, email address, government ID number, image of a physical document, etc.) for the user 108, the wallet identifier (for the user's virtual wallet account), a timestamp and assurance data related to the virtual wallet account and/or the payment account added thereto (via the virtual wallet application 116). The assurance data includes and/or is indicative of one or more historic details about the provisioned payment account and/or the virtual wallet application 116, which, in general, provides the service provider 102 with a metric to judge the trustworthiness and/or credit worthiness of the user 108, etc. Specifically, for example, the assurance data may include, without limitation, an interval since the payment account was added to the virtual wallet application 116 (i.e., a number of hours, days, weeks or months, between the addition of a payment account token and the present (generally)), and an interval since a last transaction was performed through the virtual wallet application 116 (i.e., a number of hours, days, weeks or months, between a last transaction and the present (generally)), etc. Other intervals related to the payment account, the virtual wallet account and/or the virtual wallet application 116 may also be included in the assurance data. Moreover, where the virtual wallet application 116 is provisioned with multiple payment accounts, the subscription message may include a number of accounts added, a number of active accounts, a summary of the last transaction, which, like other data, may be provided per account or in general to the virtual wallet application 116 (e.g., for a last purchase to account ending in #1234 (i.e., at an account level) versus a last purchase by the wallet (i.e., at a wallet level), etc.), etc. Furthermore, in at least one embodiment, the subscription message includes a flag indicative of the provisioned payment account and/or PII, which indicates a token associated with the same is provisioned to the virtual wallet application 116. In other words, the assurance data may simply include a flag indicative of a token stored in the virtual wallet application 116 (e.g., YES/NO, 0/1, etc.).

In turn, the subscription message is received at the service provider 102 (and in particular, the computing device 200 associated therewith). And, the service provider 102 is configured to determine, based on the subscription message (e.g., the assurance data, etc.) and one or more rules, whether to rely on the payment account provisioned to the virtual wallet application 116 as a proxy for directly verifying the user 108 in connection with providing the requested service(s) to the user. If the service provider 102 determines to rely on the assurance data included in the subscription message as a suitable proxy for verification of the user 108 (without requiring or requesting further verification of the user 108 with a third party, apart from the virtual wallet platform 114 and/or virtual wallet application 116), the service provider 102 is configured to store the subscription message (or part thereof) in memory (e.g., the wallet identifier and timestamp included in the subscription message, etc. in memory 204; etc.).

In at least one embodiment, where the subscription message does not include PII, the service provider 102 may be configured to submit an additional request, via an API call, to the virtual wallet platform 114 for PII. When the user 108 is authenticated and/or has consented, as described above, the virtual wallet platform 114 may be configured to transmit a PII message including the PII requested by the service provider 102, or the PII to which the user's consent refers, or PII in the possession of the virtual wallet platform 114, etc. Regardless of whether the PII is included in the subscription message or in a separate PII message, the service provider 102 may further be configured to rely on the PII in determining whether or not to rely on the message(s) from the virtual wallet platform 114 as a proxy for verifying the user 108 directly. That is, the service provider 102 may be configured to request certain identifying information about the user 108 through the virtual location 112 in connection with the user's attempt to subscribe to the one or more services. The service provider 102 may then be configured to compare that identifying information to the PII received from the virtual wallet platform 114, whereby one or more rules applied by the service provider 102 may indicate to rely on the virtual wallet platform message(s) for verification, or not Upon determining to rely on the virtual wallet platform message(s), the service provider 102 is configured to then proceed in opening the account associated with the one or more services, to which the user 108 is attempting to subscribe (again, without requesting or requiring further verification of the user 108 with a third party and apart from the virtual wallet platform 114 and/or virtual wallet application 116). As part thereof, the service provider 102 may be configured to proceed with the PII received from the virtual wallet application 116 and/or the virtual wallet platform 114, as the information for the user 108. In this manner, the user 108 is permitted to proceed in the subscription process, without having to further verify his/her PII at that time and/or without the service provider 102 having to otherwise verify the user 108 with a third party and apart from the virtual wallet platform 114 and/or virtual wallet application 116.

Also when the service provider 102 determines to rely on the data included in the subscription message, or other messages, as a suitable proxy, the service provider 102 is configured to generate and transmit a notification of reliance to the virtual wallet platform 114 and/or the virtual wallet application 116. In this manner, the virtual wallet platform 114 (or the virtual wallet application 116) may be configured to receive and store the notification of reliance in memory (e.g., the memory 204, etc.). Thereafter, if/when the user 108 deletes the payment account from the virtual wallet application 116 (i.e., which is the basis for the subscription message), for example, if the payment account is closed, etc., the virtual wallet platform 114 is configured to generate and transmit a notice to the service provider 102 related to the status of the payment account and/or to suggest re-evaluation of the user 108 associated with the account and/or service(s) of the service provider 102.

Consistent with the above, when a payment account is associated with a card that is cancelled (e.g., due to the card being lost or stolen, etc.) or expired, the virtual wallet platform 114 is configured to generate and transmit a notice to the service provider 102 indicating the circumstances and/or indicative that the payment account has been re-issued, thereby permitting the service provider 102 to re-initiate the verification of the user 108 through the newly issued payment account (when provisioned again to the virtual wallet application 116). Alternatively, the virtual wallet platform 114 may be configured to omit a notice to the service provider 102 when the new card is provisioned to the virtual wallet application 116 and used for one or more transactions.

Notwithstanding the above, it should be understood that if the service provider 102 determines not to rely on the messages from the virtual wallet platform 114 as a suitable proxy, the service provider 102 may be configured to proceed with conventional verification processes, which may be manual or automated and whereby the user 108 will be requested to verify his/her PII in another manner.

Figure 3:
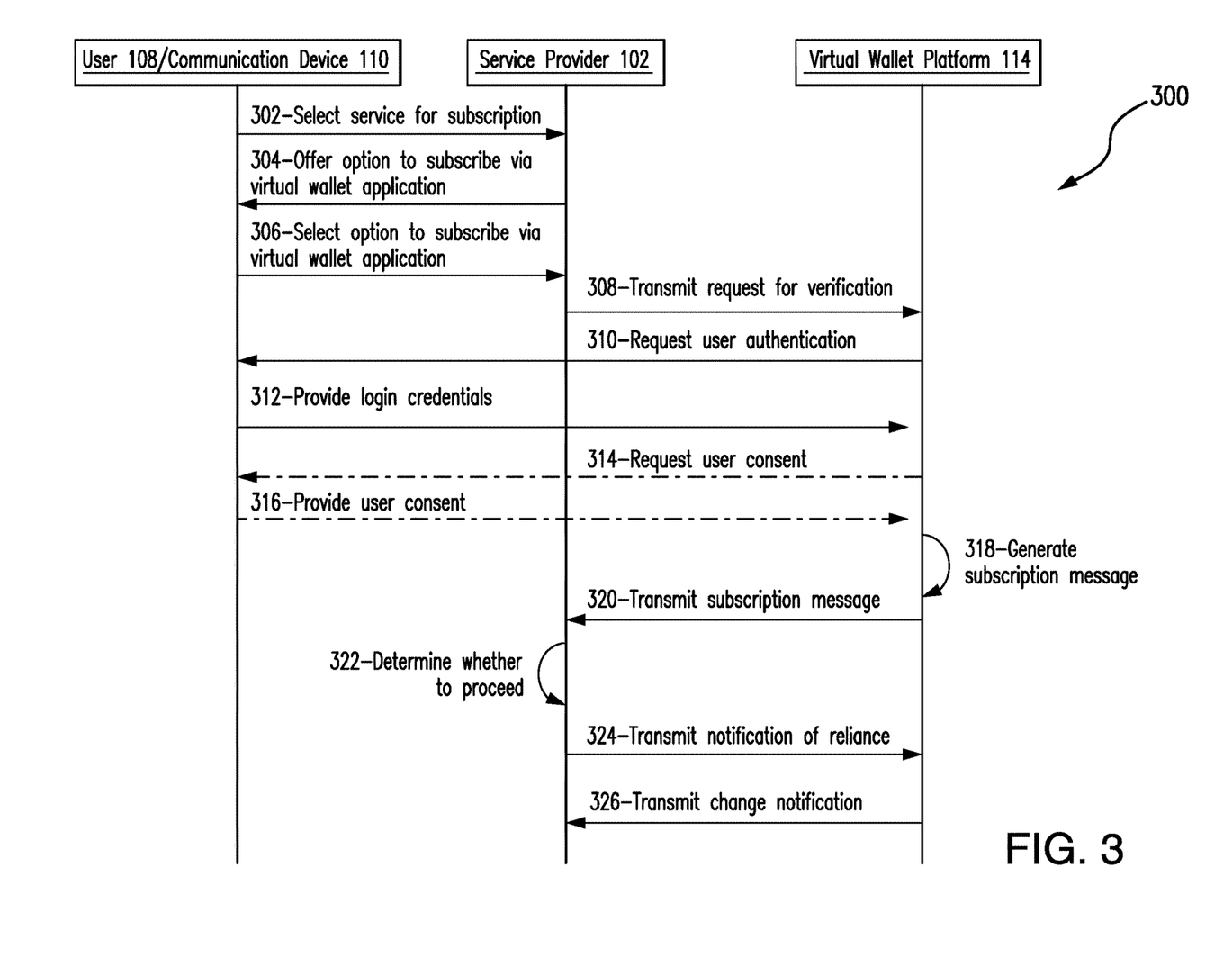
FIG. 3 is an exemplary method that may be implemented in the system of FIG. 1 for use in verifying a user in connection with a subscription, by the user, to one or more services, through the user's virtual wallet applications.

FIG. 3 illustrates an exemplary method 300 for verifying a user in connection with a subscription, by the user, to one or more services, through a virtual wallet application of the user. The exemplary method 300 is described as implemented in the service provider 102, the virtual wallet platform 114 and the virtual wallet application 116 of the system 100, and also with reference to the computing device 200. However, it should be understood that the methods herein are not limited to the exemplary system 100 or the exemplary computing device 200. Likewise, the systems and the computing devices herein should not be understood to be limited to the exemplary method 300.

At 302 in the method 300, the user 108 initially selects a service (or multiple services) offered by the service provider 102, for which to subscribe. In particular, the user 108 may browse through different services offered by the service provider 102 at the virtual location 112 (or a subscription interface herein) associated with the service provider 102, or speak with a representative of the service provider 102 at a physical location of the service provider 102 (e.g., at the location 112, etc.). In this exemplary embodiment, the user 108 may select the desired service(s) at a website (broadly, the virtual location 112) associated with the service provider 102 and then select a button titled "Subscribe" or "Enroll" or "Apply," etc.

In response, the service provider 102 offers, at 304, the user 108 an option to subscribe through one or more virtual wallet applications, such as the user's virtual wallet application 116. In particular, the service provider's website may cause a subscription interface to be displayed at the communication device 110 (or other computing device associated with the user 108), which includes the option to "Subscribe with Virtual Wallet Verification" or other description. When the service provider 102 has relationships and/or integration with multiple virtual wallet applications, the subscription interface may further solicit a selection from the user 108 of one of the multiple virtual wallet applications. In addition, the subscription interface may include an option to subscribe through conventional means, and a description and/or summary of the different options.

At 306, the user 108 selects (in the subscription interface) the option to subscribe via the virtual wallet application 116 (and further selects the virtual wallet application 116, as applicable). In doing so, the user 108 is prompted to input a wallet identifier, such as, for example, a phone number, an email address, etc. associated with the user's virtual wallet application 116 and/or virtual wallet account. The wallet identifier and the user's selection of the option to subscribe via the virtual wallet application 116 are provided to the service provider 102. It should be appreciated that PII may also optionally be requested by the service provider 102 (and provided from the user 108), in the subscription interface or similar interface (from the service provider 102) in connection with the user's selection of the option to subscribe via the virtual wallet application 116. The PII may include, without limitation, a name of the user 108, a billing address of the user 108 (including postal code), a government ID number, an email address, a phone number, etc., whereby the PII may be used to validate the user 108 against PII received from the virtual wallet platform 114 (as described below). In turn, the service provider 102 identifies the virtual wallet platform 114 (as associated with the user's virtual wallet application 116), and transmits, at 308, a request to the virtual wallet platform 114 for verification of the user 108 via the user's virtual wallet application 116. The request is transmitted, for example, as an API call to the virtual wallet platform 114.

Then in the method 300, the virtual wallet platform 114 authenticates the user 108. In particular, the virtual wallet platform 114 requests, at 310, via a lightbox pop-up overlaid on the service provider's website or subscription interface (broadly, at the virtual location 112), login credentials for the user 108, for the user's virtual wallet account. The login credentials may include the wallet identifier or a username, and also a password or biometric, from which the user 108 may be authenticated and/or associated with the virtual wallet account (and whereby the user's virtual wallet account may be identified by the virtual wallet platform 114). The user 108, in response, provides, at 312, the username, wallet identifier, password, and/or biometrics (broadly, login credentials), as requested, to the virtual wallet platform 114, via the lightbox pop-up overlaid on the service provider's website or subscription interface. Once received, the virtual wallet platform 114 authenticates and/or identifies the user 108 based on the login credentials (e.g., by comparing the received login credentials to login credentials stored in memory (e.g., memory 204 of the computing device 200 associated with the virtual wallet platform 114, etc.) in association with the user's virtual wallet account, etc.). Then, after the user 108 is authenticated and/or identified, the virtual wallet platform 114 optionally (as indicated by the dotted lines in FIG. 3) requests, at 314 consent from the user 108 to share PII of the user 108 with the service provider 102, via another lightbox pop-up overlaid on the service provider's website or subscription interface (broadly, at the virtual location 112). The user 108, in response, provides, at 316, consent for sharing of the user's PII with the service provider 102. The response from the user 108 may include a simple consent, or it may include specific consent to particular PII in the possession of the virtual wallet platform 114 (e.g., share name, address, etc., but do not share government ID number, etc.)

With that said, it should be appreciated that the virtual wallet platform 114 may interact with the user 108 for the login credentials and/or for the consent through the virtual wallet application 116, apart from the virtual location 112 and/or the service provider 102, or through the virtual location 112. When such interaction is through the virtual wallet application 116, the login and/or consent interface will be provided, by the virtual wallet platform 114, at the communication device 110 (where the virtual wallet application 116 is installed) regardless of whether the user 108 initiated the subscription for the desired service(s) at the communication device 110 or at another computing device.

Next, upon receipt of the valid login (or authentication) (and consent, as requested), the virtual wallet platform 114 generates, at 318, a subscription message for the user 108. In this exemplary embodiment, the subscription message includes the wallet identifier for the user's virtual wallet application 116 (e.g., a phone number, another identifier, etc.), PII (e.g., the user's name, shipping and billing addresses, gender, place of birth, date of birth, biometrics, mother's maiden name, government ID number, image(s) of physical documents, etc.), and a timestamp indicative of the time and date that the subscription message is generated (or transmitted). The subscription massage further includes assurance data related to the user's payment account associated with the virtual wallet application 116, such as, for example, an interval since the payment account was added to the virtual wallet application 116 and an interval since a last purchase using the virtual wallet application 116 was performed, etc. As explained above, when the virtual wallet application 116 includes multiple payment accounts, the assurance data may be provided at the wallet level or the account level, and include a number of payment accounts associated with the virtual wallet application 116, a number of active accounts, a last transaction to the wallet and/or each account, etc. In at least one embodiment, the subscription message may include PII and not assurance data related to one or more payment accounts.

At 320, the virtual wallet platform 114 then transmits the subscription message to the service provider 102.

In turn in the method 300, the service provider 102 determines, at 322, whether to proceed in the subscription with the user 108, while relying on the subscription message from the virtual wallet platform 114. Specifically, the service provider 102 may impose a threshold for transactions (i.e., a rule), which requires a most recent transaction through the virtual wallet application 116 to have been within the last forty-eight (48) hours, or some other interval. Likewise, the service provider 102 may impose another rule, which includes a threshold for the payment account being added to the virtual wallet application 116 and requires the payment account to have been added at least more than thirty (30) days prior to the request to subscribe, or that the payment account has been provisioned to the virtual wallet application 116 for a minimum interval, etc. The service provider 102 may further impose rules which rely on PII included in the subscription message, or in a subsequent PII message, to determine whether a billing or shipping address of the user 108 falls within a service area of the service provider 102, or to otherwise validate the user's need for the service(s) offered by the service provider 102 (or requested by the user 108), etc. The service provider 102 may further impose a rule which requires PII received from the virtual wallet platform 114 to match identifying information received from the user 108 in a subscription interface in connection with the user's request to subscribe to one or more services (e.g., in connection with the operations at 302-306, etc.). In another example, the service provider 102 may impose a rule which requires the PII to include a valid physical document indicative of the user's identify (e.g., a passport, a driver's license, etc.). The service provider 102 may also impose a rule which confirms that the timestamp of the subscription message is within a predefined interval (e.g., within the last two hours, six hours, one day, etc.). It should be appreciated that various other thresholds and/or rules may be imposed by the service provider 102, and based on assurance data included in the subscription message, or other data included in the subscription message or other message received from the virtual wallet platform 114 (e.g., when assurance data is omitted therefrom, etc.), whereby the service provider 102 will decide to proceed in the subscription (thereby relying on the verification of the user from the virtual wallet platform 114), or not.

In relying on the subscription message from the virtual wallet platform 114, and when the subscription message includes the wallet identifier for the user's virtual wallet application 116, the service provider 102 may use the wallet identifier to identify or match or otherwise confirm the selected service to the user's specific virtual wallet application 116 (which was invoked for performing the selection of the service) (e.g., use the wallet identifier to ensure that the service is provided to the user 108 that requested the service, etc.). In addition, the wallet identifier may be used by the service provider 102 to differentiate the virtual wallet platform 114 and/or the virtual wallet application 116 from other wallet providers (e.g., to determine that the received message relates to a selected service associated with the service provider 102, etc.).

It should be also appreciated that upon receipt of the valid login (or authentication of the user 108), the virtual wallet platform 114 may provide more than the subscription message to the service provider 102. For example, where the virtual wallet platform 114 included PII for the user 108, the appropriate PII may be transmitted to the service provider 102 in the subscription message or in a separate PII message. That is, the service provider 102 (prior to or after deciding to rely on message(s) as a proxy) may request certain PII from the virtual wallet platform 114, via one or more API calls (or otherwise). To the extent the virtual wallet platform 114 possesses the requested PII and authentication and/or consent is provided by the user 108, the virtual wallet platform 114 may transmit a PII message (like the subscription message) to the service provider 102. The PII message would include, without limitation, the wallet identifier, the timestamp and the PII data, etc.

When the service provider 102 determines to rely on the subscription message and/or other message(s) as a proxy for direct verification of the user 108, and receives the requested PII, if any, and determines to proceed with the requested subscription/service(s) (while omitting further verification of the user 108 with a third party and apart from the virtual wallet platform 114), the service provider 102 stores the subscription message, or part thereof, or other message(s) in memory (e.g., in the memory 204 of the computing device associated with the service provider 102, etc.) as a record of the verification of the user 108. In this manner, if an issue with the user 108 arises, a record is available to determine what manner of verification was performed and which virtual wallet application 116 and/or payment account was relied upon for verification of the user 108. The record may be indexed by the wallet identifier or otherwise.

When the service provider 102 determines not to rely of the message(s) form the virtual wallet platform 114 as a proxy, the service provider 102 may proceed with the subscription of the user 108 through conventional verification processes.

Further in the method 300, when the service provider 102 determines to rely on the subscription message for verification and to proceed, the service provider 102 transmits, at 324, a notification of reliance to the virtual wallet platform 114, thereby informing the virtual wallet platform 114 that the service provider 102 has relied on the subscription message. The virtual wallet platform 114 records an indication of reliance, based on the notification, as part of the virtual wallet account for the user 108, in memory 204 thereof. Thereafter, if the user 108 deletes or otherwise changes the payment account from the virtual wallet application 116 (i.e., to prevent transactions through the virtual wallet application 116 or otherwise suggests the payment account status is changed, etc.), the virtual wallet platform 114 transmits, at 326, a change notification to the service provider 102, when the payment account is deleted from the virtual wallet account and the virtual wallet account includes an indication of reliance by the service provider 102. The change notification permits the service provider 102 to seek verification in another manner, or to omit further verification based on interactions with the user 108 since the subscription to the service(s) was previously permitted to proceed.

Again and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, by at least one computing device, from a service provider, a request to verify a user associated with a virtual wallet account in connection with subscription of the user to at least one service associated with the service provider, the virtual wallet account associated with a communication device of the user and provisioned with at least one payment account; (b) requesting, by the at least one computing device, authentication of the user to the virtual wallet account; (c) after authentication of the user, generating, by the at least one computing device, a subscription message, the subscription message including at least assurance data for the user based on the virtual wallet account, a timestamp, and a wallet identifier for the virtual wallet account and/or the communication device, the assurance data including historic details of the at least one payment account and/or the virtual wallet account; (d) transmitting the subscription message to the service provider in response to the request to verify the user associated with the virtual wallet account, thereby permitting the service provider to rely on the assurance data and to proceed, or not, with subscription of the user to the at least one service while omitting further verification of the user with a third party and apart from the at least one computing device; (e) receiving, by the at least one computing device, a notification of reliance from the service provider indicating that the subscription message was relied upon in connection with subscription of the user to the at least one service; (f) recording, by the at least one computing device, an indication of reliance, based on the notification, as part of the virtual wallet account for the user, in memory; and (g) transmitting a change in payment account notification to the service provider, when the at least one payment account is altered in the virtual wallet account and the virtual wallet account includes an indication of reliance by the service provider, thereby permitting the service provider to re-evaluate verification of the user.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements/features recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for verifying a user, through an account associated with the user, in connection with a subscription of the user to one or more services, the system comprising:
   a memory including a virtual wallet account for a user, the virtual wallet account associated with a mobile application at a communication device associated with the user and including login credentials for the mobile application, the virtual wallet account further provisioned with at least one issued payment account for the user; and
   a payment network configured to process a transaction involving the at least one issued payment account provisioned to the virtual wallet account, the payment network including a platform computing device coupled to and/or including the memory, wherein the platform computing device is configured to:
      receive an application programming interface (API) call including a request from a service provider, in connection with the user subscribing to at least one service offered by the service provider at a virtual location associated with the service provider, the service provider separate from the payment network;

in response to the request, cause a login interface to be displayed to the user, via the mobile application, at the communication device;

receive login credentials from the user for the mobile application, via the login interface;

authenticate the user, based on a match of the received login credentials and the login credentials for the mobile application associated with the user included in the memory;

in response to the user being authenticated, generate a subscription message for the user, the subscription message including assurance data based on the virtual wallet account for the user, a timestamp, and an identifier associated with one or more of the mobile application, the virtual wallet account and the user, the assurance data indicative of at least one interval associated with the at least one issued payment account; and transmit the subscription message to the service provider, in response to the request, to thereby permit the service provider to rely on the assurance data included in the subscription message to verify the user, in lieu of direct identification and verification of the user by the service provider apart from the platform computing device.

2. The system of claim 1, wherein the subscription message includes personal identifying information (PII) for the user, the PII including multiple of: a name of the user, an address of the user, a date of birth of the user, and a government identifier unique to the user.

3. The system of claim 1, wherein the platform computing device includes a wallet platform computing device; and wherein the mobile application includes a virtual wallet application at the communication device associated with the user.

4. The system of claim 3, wherein said at least one interval associated with the at least one issued payment account includes an interval since the at least one issued payment account was provisioned to the virtual wallet account.

5. The system of claim 4, wherein the assurance data further includes an interval since a last transaction initiated through the virtual wallet application at the communication device and funded by the at least one issued payment account.

6. The system of claim 3, wherein the service provider includes one of a utility provider and a banking institution.

7. The system of claim 6, wherein the wallet platform computing device is further configured to transmit a personal identifying information (PII) message to the service provider, in response to an application programming interface (API) call for PII after the subscription message is generated and transmitted to the service provider.

8. A computer-implemented method for providing verification of a user, through a virtual wallet account associated with the user, in connection with a subscription of the user to one or more services, the method comprising:

receiving, by at least one computing device associated with a payment network, from a service provider, an application programming interface (API) call including a request to verify a user associated with a virtual wallet account in connection with subscription of the user to at least one service associated with the service provider, the virtual wallet account associated with a communication device of the user and provisioned with at least one payment account, the payment network separate from the service provider;

in response to the API call, requesting, by the at least one computing device, authentication of the user to the virtual wallet account via a login interface displayed to the user at the communication device;

in response to authentication of the user, generating, by the at least one computing device, a subscription message, the subscription message including at least assurance data for the user based on the virtual wallet account, a timestamp, and a wallet identifier for the virtual wallet account and/or the communication device, the assurance data including historic details of the at least one payment account and/or the virtual wallet account; and transmitting the subscription message to the service provider in response to the request to verify the user associated with the virtual wallet account, thereby permitting the service provider to rely on the assurance data and to proceed, or not, with subscription of the user to the at least one service while omitting further verification of the user with a third party and apart from the at least one computing device.

9. The computer-implemented method of claim 8, wherein the subscription message includes at least a portion of personal identifying information (PII) for the user included in the at least one computing device and associated with the virtual wallet account.

10. The computer-implemented method of claim 9, further comprising requesting, by the at least one computing device, and receiving consent from the user to share the PII with the service provider, prior to generating the subscription message; and wherein the subscription message includes the at least a portion of the PII only when consent is provided from the user.

11. The computer-implemented method of claim 8, wherein the assurance data includes an interval since a last transaction initiated by a virtual wallet application at the communication device, and associated with the virtual wallet account, and funded by the at least one payment account.

12. The computer-implemented method of claim 8, wherein the assurance data includes at least one of an interval since the at least one payment account was added to the virtual wallet account and an interval since issuance of the at least one payment account to the user.

13. The computer-implemented method of claim 8, wherein requesting authentication of the user includes one of:

causing the login interface to be displayed to the user, via the service provider, at the communication device; and causing the login interface to be displayed to the user, via a virtual wallet application at the communication device and associated with the virtual wallet account.

14. The computer-implemented method of claim 8, further comprising:

receiving, by the at least one computing device, a notification of reliance from the service provider indicating that the subscription message was relied upon in connection with subscription of the user to the at least one service;

recording, by the at least one computing device, an indication of reliance, based on the notification, as part of the virtual wallet account for the user, in memory; and transmitting a change in payment account notification to the service provider, when the at least one payment account is altered in the virtual wallet account and the virtual wallet account includes the indication of reliance by the service provider, thereby permitting the service provider to re-evaluate verification of the user.

15. A non-transitory computer-readable storage media including executable instructions for providing verification of a user, through a virtual wallet account associated with the user, in connection with subscription by the user for at least one service, which when executed by at least one processor of a payment network, cause the at least one processor to:
receive, from a service provider, an application programming interface (API) call including a request to verify a user associated with a virtual wallet account in connection with subscription of the user to at least one service associated with the service provider, the virtual wallet account associated with a communication device of the user and provisioned with at least one payment account, the payment network separate from the service provider;
in response to the user being authenticated to the virtual wallet account in connection with the request, generate a subscription message having assurance data, a timestamp, and a wallet identifier for the virtual wallet account and/or the communication device, the assurance data including an interval associated with a last transaction to the at least one payment account and/or an interval associated with provisioning of the at least one payment account to the virtual wallet account; and
transmit the subscription message to the service provider in response to the request to verify the user associated with the virtual wallet account, thereby permitting the service provider to rely on the assurance data in proceeding, or not, with subscription of the user to the at least one service, without further and separately verifying the user with a third party and apart from the at least one processor.

16. The non-transitory computer-readable storage media of claim 15, wherein the executable instructions, when executed by the at least one processor, further cause the at least one processor to:
record an indication of reliance as part of the virtual wallet account for the user, wherein the indication is based on a notification from the service provider indicating reliance of the service provider on at least part of the subscription message; and
transmit a change notification to the service provider, when the virtual wallet account includes the indication of reliance and the at least one payment account is deleted from the virtual wallet account, thereby permitting the service provider to re-evaluate verification of the user.

17. The non-transitory computer-readable storage media of claim 15, wherein the subscription message includes personal identifying information (PII), thereby permitting the service provider to validate PII received from the user, in connection with the subscription of the user to the at least one service, based on the PII included in the subscription message.

18. The system of claim 3, wherein the wallet platform computing device is further configured to:
receive, from the service provider, a notification of reliance indicating reliance of the service provider on the subscription message in connection with subscription of the user to the at least one service; and
record an indication of reliance, based on the notification, as part of the virtual wallet account for the user, in the memory.

19. The system of claim 18, wherein the wallet platform computing device is further configured to transmit a change notification to the service provider, when the at least one issued payment account is deleted from the virtual wallet account and the virtual wallet account includes the indication of reliance by the service provider.

* * * * *